June 19, 1934.  P. GERSCHEL  1,963,785

INKWELL

Filed Aug. 16, 1933

Inventor:
Paul Gerschel

Patented June 19, 1934

1,963,785

UNITED STATES PATENT OFFICE 1,963,785

INKWELL

Paul Gerschel, Strasbourg, France

Application August 16, 1933, Serial No. 685,314
In France August 19, 1932

2 Claims. (Cl. 120—57)

The object of this invention is an ink-well designed in such a way that, whatever its position, the ink cannot be spilt therefrom, thus ensuring extreme cleanliness in handling, and avoiding the damage which often occurs when the ink is upset, This ink-well owes its novelty to the fact that it is composed of several parts assembled preferably by means of screwing, as this method greatly facilitates the work of cleaning, as the parts can be disassembled for this purpose, and also allows a great variation in the composition of the colours of the said parts.

The accompanying drawing shows, by way of example, two embodiments of the new ink-well for inks of different colours.

Figure 1:
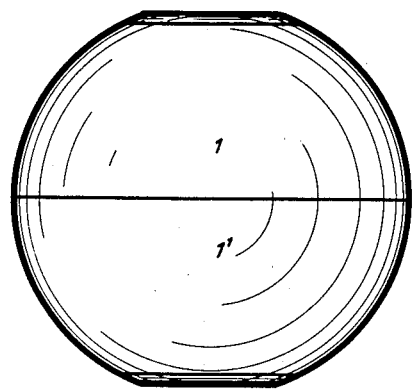
Fig. 1 is an elevation of the first embodiment.
Figure 2:
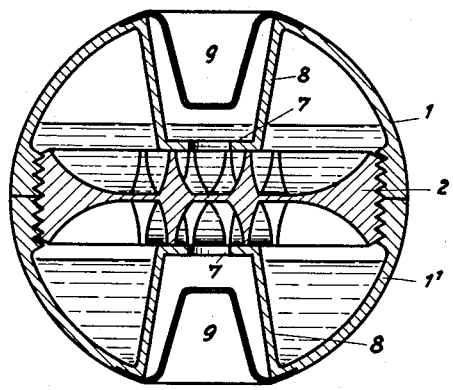
Fig. 2 is an axial section.
Figure 3:
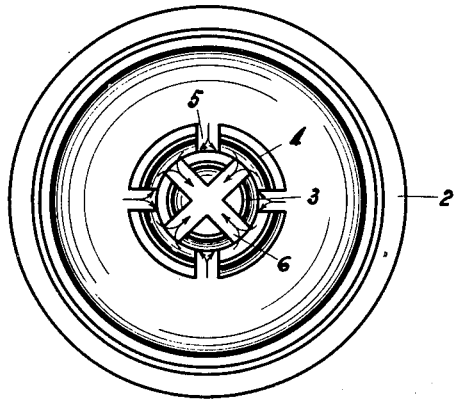
Fig. 3 is a plan of the intermediate base of the ink-well.

According to Figs. 1-3, the ink-well is preferably in the form of a hollow bowl, composed of two hemispherical shells, 1, 1', with flattened poles, and an intermediate base 2, in the form of a circular disc, the assembling of these parts being carried out by means of screwing; for this purpose, the disc is provided on its circumference with a thread, so that a perfectly watertight joint between the shells and the disc is effected in this manner without the use of a lining.

The intermediate base is hollowed in the form of a trough on its two flat faces, and in the middle of these troughs are placed two concentric, annular projections 3, 4, intersected by the radial channels 5, 6. It will be noticed that these channels are displaced from one projection to the other, so that the ink is forced to take a sinuous course in order to reach the central bowl, which is bounded by the internal circular projection 3, from which the ink is taken for use. It therefore reaches this bowl free from all the foreign matter and impurities which may have been contained therein.

Each shell 1, 1', is provided with a funnel in the form of a truncated cone 8 commencing on the inside of the pole and is provided with a perforated base 7 which comes to rest on the internal annular projection 3, of the intermediate base 2. Thus there are formed between the walls of the shells and their funnels and the corresponding walls of the intermediate base, comparatively large, annular spaces for receiving the ink. Normally, however, the latter will only be filled up to the edges of the troughs formed in the base 2.

In the funnels 8 are fitted also the truncated cone mouthpieces 9, the wide turned-back edges of which fit against the outside walls of the shells.

Figure 4:
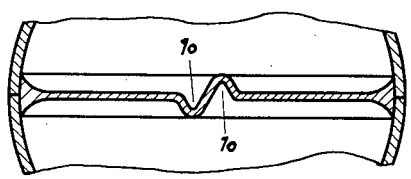
Fig. 4 is a partial axial section of the second embodiment.

The embodiment represented in Fig. 4 only differs from the previous one in the fact that the two hemispherical shells, instead of being screwed together, are stuck together. Moreover, the intermediate base is not lined with the concentric crowns 3 and 4, but comprises below the orifices of the funnels 8 cavities 10 in which the pen is dipped for the taking of ink, by virtue of which a larger quantity of ink remains adhering to the pen.

The ink-well designed in this manner can occupy any position without any fear of the ink being upset. For purposes of cleaning, it is easy to dismount the ink-well into its various constituent parts. It can be constructed from any suitable material, moulded or stamped in the mass or pressed, and notably from ebonite, glass, rustless sheet metal, etc. It is conceivable that, instead of being spherical, the ink-well can have any other appropriate form, such as, for instance, that of a prism or of an icosahedron, et cetera. Its dimensions can also vary according to requirements. Finally, instead of having two compartments, the ink-well need only have one. In this case, the intermediate base 2 can be dispensed with and the two shells can be screwed directly together.

I claim:

1. An ink-well designed for avoiding accidental running out of ink comprising two shells, an intermediate base, screw threads on the circumference of the intermediate base and on the inner side of the shell walls for screwing all parts together, troughs hollowed in the flat faces of the intermediate base, concentric annular projections in the middle of the troughs, channels for the passage of the ink in the projections and displaced from one projection to the other.

2. In an ink-well as claimed in claim 1 funnels in the shells abutting against the concentric annular projections, perforations in the funnels for the passage of the pen.

PAUL GERSCHEL.